United States Patent
Blackstock

(10) Patent No.: US 10,682,989 B2
(45) Date of Patent: Jun. 16, 2020

(54) AUTOMATED CAR WASH CONVEYOR SYSTEM AND METHODS THERETO

(71) Applicant: Limin' Innovations LLC, Thomaston, GA (US)

(72) Inventor: Scott S. Blackstock, Thomaston, GA (US)

(73) Assignee: LIMIN' INNOVATIONS LLC, Thomaston, GA (US)

( * ) Notice: Subject to any disclaimer, the term of this patent is extended or adjusted under 35 U.S.C. 154(b) by 61 days.

(21) Appl. No.: 16/116,339

(22) Filed: Aug. 29, 2018

(65) Prior Publication Data
US 2019/0061705 A1 Feb. 28, 2019

Related U.S. Application Data

(60) Provisional application No. 62/551,420, filed on Aug. 29, 2017.

(51) Int. Cl.
| | | |
|---|---|---|
| B60S 3/00 | (2006.01) | |
| G05D 7/06 | (2006.01) | |
| B60S 3/04 | (2006.01) | |
| B60S 3/06 | (2006.01) | |

(52) U.S. Cl.
CPC ............... B60S 3/004 (2013.01); B60S 3/04 (2013.01); B60S 3/06 (2013.01); G05D 7/0623 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,893,229 A | * | 1/1990 | Detrick | B60S 3/002 134/123 |
| 6,718,216 B2 | * | 4/2004 | Grier | B60S 3/04 134/56 R |
| 8,049,643 B2 | * | 11/2011 | Ness | G08G 1/0175 134/123 |
| 9,132,807 B2 | * | 9/2015 | Stadler | B60S 3/00 |
| 9,139,166 B2 | * | 9/2015 | Belanger | B60S 3/004 |
| 2013/0239992 A1 | * | 9/2013 | Detrick | F15B 15/2876 134/18 |
| 2015/0273531 A1 | * | 10/2015 | Oliver | B60S 3/004 134/18 |
| 2018/0025624 A1 | * | 1/2018 | Ness | G06T 7/246 714/47.2 |

* cited by examiner

Primary Examiner — Kyle O Logan
(74) Attorney, Agent, or Firm — Troutman Sanders LLP; Micah B. Hensley; Dustin B. Weeks

(57) ABSTRACT

The disclosed technology includes systems and methods for monitoring a vehicle's position as the vehicle is traversed through an automated car wash system via a conveyor system and can comprise one or more sensors located in a tunnel of the automated car wash system. Embodiments can include targeting specific portions of the vehicle with water and chemical dispensers, washers, and dryers. Embodiments can include determining whether a vehicle deviates from a predetermining conveyor path or from a predetermined spacing with respect to an adjacent vehicle, and if so, initiating measures to prevent a collision.

20 Claims, 6 Drawing Sheets

AUTOMATED CAR WASH CONVEYOR SYSTEM AND METHODS THERETO

CROSS REFERENCE TO RELATED APPLICATIONS

This application claims benefit, under 35 U.S.C. § 119(e), of U.S. Provisional Application No. 62/551,420, filed 29 Aug. 2017, the entire contents and substance of which is hereby incorporated by reference in its entirety.

BACKGROUND

Automated car wash systems permit a vehicle to be washed without requiring a driver to control the vehicle. Many automated car wash systems are configured to automatically traverse a vehicle through a tunnel or other enclosure with a conveyor system such that one or more washers can wash the vehicle as it passes by each of the washers. Traditionally, as the conveyor system traverses a vehicle through the tunnel of the automated car wash system, chemical dispensers, water dispensers, and brushes and other washers are programmed to function based on a timer (e.g., each performs its associated function after a certain amount of time has elapsed subsequent to the vehicle entering the tunnel). Such a timing function, however, fails to take into the size of the vehicle, which may result in excess or insufficient detergent or water being applied to a particular vehicle or may result in a washer, such as a brush, or a dryer failing to fully engage the vehicle (e.g., at least a portion of the vehicle is not washed with a brush) or a washer or dryer may be engaged when a vehicle is not positioned at an appropriate location, wasting energy. Similar misuse of materials or washing efforts may result from errors that may occur during the traversal of the vehicle through the tunnel, as described more fully below.

In some conveyorized automatic car wash systems, the conveyor system can simultaneously traverse two or more vehicles through the tunnel in series. Traditionally, automated car wash systems require a driver to control a vehicle to a conveyor track such that one or more wheels of the vehicle are aligned with a conveyor that transports the vehicle through the tunnel. Generally, once the wheels are appropriately aligned with the conveyor, a roller (or another device, such as a chock configured to traverse along the conveyer path) engages a wheel of the vehicle, the vehicle is shifted into the neutral gear such that the wheels of the vehicle can freely roll, and the roller then either pushes or pulls the tire along the conveyor path through the tunnel.

In such systems, however, there is potential for a vehicle to deviate from the path of the conveyor such that the conveyor can no longer traverse the vehicle through the tunnel. For example, a driver may turn the steering wheel while the vehicle is within the tunnel, which may cause the wheels of the vehicle to deviate from the conveyor path. As additional examples, a driver may engage the brakes of the vehicle or shift the vehicle to a gear other than neutral while the vehicle is within the tunnel, which may cause the wheels of the vehicle to disengage the roller. Further, vehicles including self-driving technology or auto-braking technology, which may be configured to detect upcoming objects and automatically engage the brakes of the vehicle, may sense the presence of one or more brushes or other washers of the automated car wash system and, in response, may automatically engage the brakes of the vehicle. Other scenarios may result in the vehicle wheel disengaging the roller or the conveyor otherwise becoming unable to traverse the vehicle through the tunnel. Regardless, if the conveyor is no longer controlling a vehicle, that vehicle is likely to be stopped or stuck within the tunnel, and a subsequent vehicle that is still being controlled by the conveyer and traversed through the tunnel is likely to collide with the stopped or stuck vehicle. Additionally, a vehicle may stall while in the tunnel such that the vehicle is unable to drive away from the exit of the tunnel once the conveyor is no longer traversing the vehicle. This may result in the vehicle being stopped at the exit of the tunnel just beyond the control of the conveyor, and the conveyor may still be traversing subsequent vehicles through the tunnel toward its exit. This may result in the conveyor system traversing a subsequent vehicle into the stopped vehicle, causing a collision, which could result in damage to one or both vehicles or to the automated car wash system or could even cause injury to the driver of one or both vehicles or to a bystander.

To avoid potential collisions, operators of automated car washes may decrease the speed of the conveyor system, may increase the distance between adjacent vehicles, or may even permit only a single vehicle to be present within the tunnel at any given time. However, these strategies result in decreased throughput for the automated car wash system, which can lead to decreased time efficiency and decreased profits for the automated car wash system and increased wait times for customers, which can lead to decreased customer satisfaction with the automated car wash system.

Further still, some automated car wash systems may include a camera-based monitoring system in which cameras are placed in the tunnel, and video recorded by the cameras is monitored to determine whether a vehicle collision has occurred. Camera-based monitoring systems, however, are unable to accurately determine the front and rear edges of a vehicle, as a camera's line of sight with respect to the vehicle is often interrupted by water jets, soap sprays, various types of brushes, and other visual obstacles included in the washers of the automated car wash system. Camera-based monitoring systems may be able to determine once a first collision has occurred and prevent subsequent collisions (an occurrence commonly referred to as a "pileup"). But because camera-based monitoring systems are typically unable to accurately determine the front edge or the rear edge of a vehicle as the vehicle is traversed through the tunnel during the wash process, such systems are generally unable to reliably provide sufficiently accurate or fast detection of a vehicle deviating from the conveyor path. In addition, the reliability of camera-based monitoring systems can be negatively impacted by the sprays, foams, chemicals, and moisture present in the tunnel of an automated car wash system as these and other elements can fog camera lenses, obfuscate visibility, or otherwise interfere with the ability of the camera-based monitoring system to monitor vehicles in the tunnel. These and other factors can result in camera-based monitoring systems being unable to reliably prevent collisions in the first instance.

SUMMARY

These and other problems may be addressed by embodiments of the technology disclosed herein. Certain embodiments include a monitoring system comprising a plurality of sensors, and based on data received from one or more of the plurality of sensors, the monitoring system can determine one or more reference points of a vehicle to be washed in an automated car wash system. The system can track the position of the one or more reference points of the vehicle as the vehicle traverses through a tunnel of the automated car wash system.

In some embodiments, the system can instruct a detergent dispenser to dispense detergent to an area defined by at least one of the one or more reference points.

In some embodiments, the system can instruct a water dispenser to dispense water to an area defined by at least one of the one or more reference points.

In some embodiments, the system can instruct a washer or a brush to wash an area defined by at least one of the one or more reference points.

In some embodiments, the system can instruct a dryer to dry an area defined by at least one of the one or more reference points.

In some embodiments, the system can determine when the vehicle deviates from a predetermined path (which may take into account location) or progression (which may take into account location, as well as time) through the tunnel. Responsive to determining that the vehicle has deviated from the predetermined path or progression, the system can stop or halt the automated car wash system.

In some embodiments, responsive to determining that the vehicle has deviated from the predetermined path or progression, the system can stop or halt only portions of the automated car wash system that are at or behind the location of the vehicle.

In some embodiments, responsive to determining that the vehicle has deviated from the predetermined path or progression, the system can determine an estimated future path of the vehicle.

In some embodiments, the system can determine, based on the estimated future path, whether the vehicle will collide with a moveable washer located at a current location, and responsive to determining that the vehicle will collide with the moveable washer at the current location, provide instructions to the moveable washer to move to a safe location outside of the estimated future path.

In some embodiments, responsive to determining that a first vehicle has deviated from the predetermined path or progression, the system can determine the position of a following second vehicle, and based on the estimated future path and estimated speed, the system can determine whether the second vehicle will collide with the first vehicle (which is located at a forward position in the tunnel relative to the second vehicle). Responsive to determining that the vehicle will collide with the forward vehicle, the system can provide instructions to stop the conveyor system to prevent the second vehicle from colliding into the first vehicle.

In some embodiments, responsive to determining that a vehicle has deviated from the predetermined path or progression, the system can determine an estimated speed of a first vehicle, and based on the estimated future path and estimated speed, the system can determine whether the first vehicle will collide with a forward second vehicle located at a forward position in the tunnel. Responsive to determining that the first vehicle will collide with the forward second vehicle, the system can provide instructions to the automated car wash system to increase the speed at which the forward second vehicle is being traversed through the tunnel.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE FIGURES

Reference will now be made to the accompanying figures, which are not necessarily drawn to scale, and wherein.

DETAILED DESCRIPTION

Figure 1A:
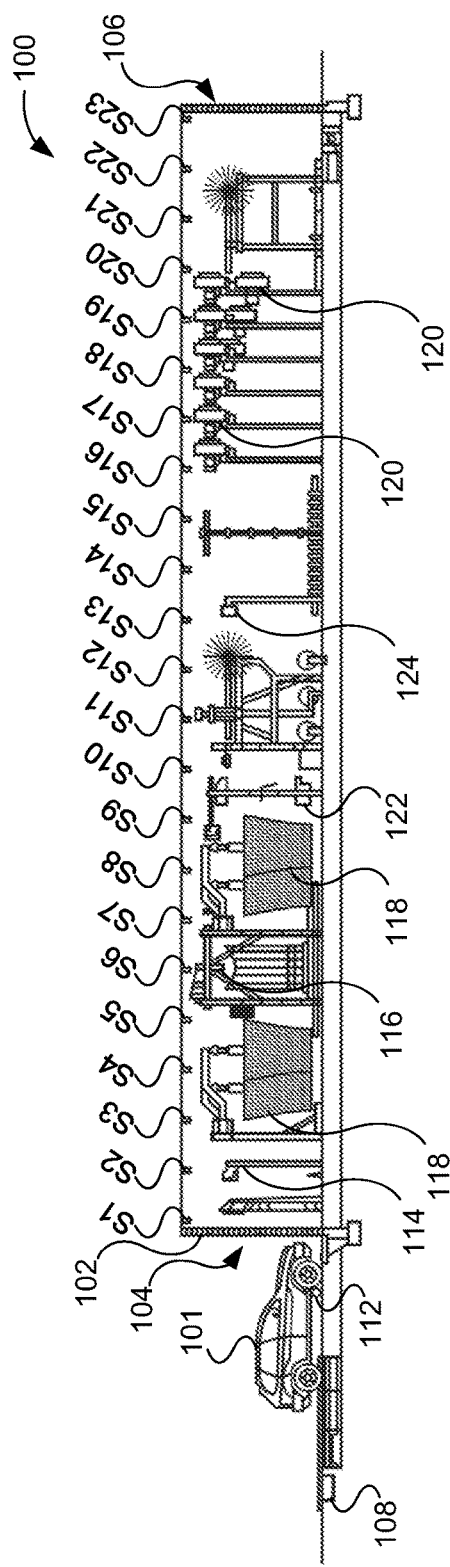
FIG. 1A is a plan view of an example automated car wash system, according to certain embodiments of the present disclosure.

Throughout this disclosure, certain example embodiments are described in relation to monitoring systems including one or more sensors that are configured to determine the respective locations of features included on a vehicle located within a tunnel of an automated car wash system, such as a forwardmost point or edge of a vehicle, a rearmost point or edge of a vehicle, outermost side points or edges of a vehicle, a windshield, a luggage rack, a cab position (e.g., relative to the forward most point, windshield, or some other reference point), a length of the cab, one or more mirrors, a truck bed cover. But embodiments of the disclosed technology are not so limited. In some embodiments, the monitoring system can be configured to determine one or more edges of a first vehicle and a second vehicle and can determine when an automated car wash system should be stopped or halted to prevent a collision. In some embodiments, the monitoring system can be configured to determine one or more washable areas of a vehicle based on the size, shape, and/or relative location of one or more features of the vehicle (e.g., forwardmost point or edge, a rearmost point or edge, outermost side points or edges, windshield, luggage rack, cab position, length of the cab, one or more mirrors, truck bed cover). The monitoring system can be configured to track the one or more washable areas of the vehicle and may provide instructions to washers or other devices of the automated car wash system such that the washers can concentrate or restrict washing materials or washing areas to the one or more washable areas. The monitoring system can be configured to provide similar instructions to dryers of the automated car wash system.

Some embodiments of the disclosed technology will be described more fully hereinafter with reference to the accompanying drawings. This disclosed technology may, however, be embodied in many different forms and should not be construed as limited to the embodiments set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

According to some embodiments, the disclosed technology relates to systems and methods for determining and tracking a location of a vehicle in an automated car wash system. In some embodiments, the system may include one or more memory devices storing instructions and one or more processors configured to execute the instructions to perform steps of a method. Specifically, in some embodiments, the system may execute the instructions to receive, from one or more sensors, vehicle location data. The sensors may be a part of the system. Alternately or in addition, one or more sensors may be separate from the system, and the system may receive data from the sensors. Various embodiments of the disclosed technology may be provided in a system (e.g., an automated car wash system), a method, or a non-transitory, computer-readable medium storing instructions that, when executed by one or more processors, cause a system to perform steps of a method.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1B:
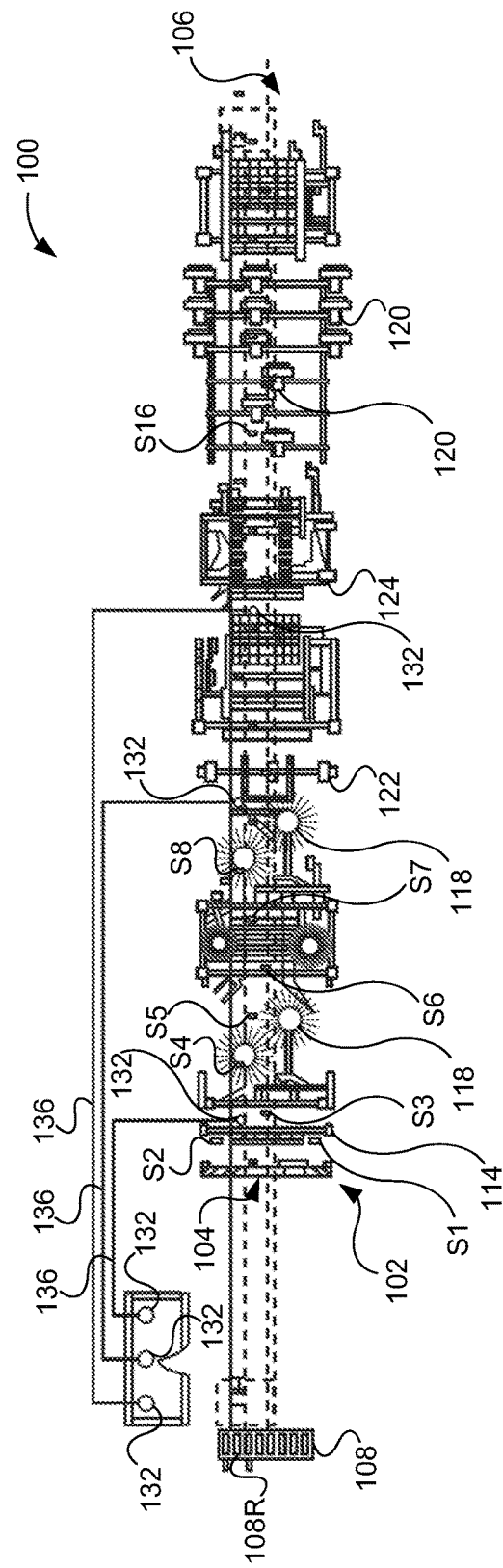
FIG. 1B is a top view of an example automated car wash system, according to certain embodiments of the present disclosure.

FIGS. 1A and 1B are schematic diagrams of an example automated car wash system according to the disclosed technology. The automated car wash system 100 can include a tunnel 102 having an entrance 104 and an exit 106. In some embodiments, a correlator 108 can be positioned outside the entrance 104 of the tunnel, and the correlator 108 can be configured to align a wheel of an approaching vehicle 101 with a conveyor 110, such as by correlator rollers 108R. In some embodiments, the correlator rollers 108R can be positioned such that the axis of each correlator roller 108R is substantially parallel to the path of the conveyor 110. Once the wheel of the vehicle 101 is aligned with the conveyor 110, a roller or chock 112 can engage the wheel of the vehicle 101. Because the roller 112 is in communication with the conveyor, motion of the conveyor 110 can be translated to the vehicle through the engaged wheel, such that the conveyer 110 can cause the vehicle 101 to traverse the length of the tunnel 102. In some embodiments, the conveyor 110 may include a system of rollers each having its axis oriented perpendicular to the path of the conveyor 110 or a continuous track. In some embodiments, a conveyor 110 including a system of rollers or a continuous track may permit the conveyor 110 to traverse a vehicle 101 through the car wash without requiring the wheels of the vehicle 101 to rotate, thus permitting the vehicle 101 to remain parked or to have its brakes engaged. In some embodiments, the automated car wash system 100 can include some or all of: one or more detergent dispensers 114, one or more water dispensers 116, one or more washers 118 (e.g., brushes), one or more dryers 120, one or more tire dressing applicators 122, one or more finishing chemical (e.g., polish, wax) applicators 124, and a plurality of sensors.

In some embodiments, the plurality of sensors (e.g., sensors S1, S2, S3, . . . ) can be positioned at various locations in the tunnel. In some embodiments, the sensors can comprise photoelectric sensors, ultrasonic sensors, LIDAR, RADAR, SONAR, or other sensors capable of providing spatial detection information. In some embodiments, the sensors exclude cameras. Some sensors can be oriented in a generally vertical direction (e.g., oriented to detect a vehicle above or below the sensor), and some sensors can be oriented in a generally horizontal direction (e.g., oriented to detect a vehicle alongside the sensor). In some embodiments, one or more sensors may be oriented in a generally diagonal direction. In certain embodiments, data from one or more sensors can be used to determine one or more features of a vehicle 101 (e.g., a front bumper, a rear bumper, roof, windshield, side mirrors, trunk, wheels). In some embodiments, data from one or more sensors can be used to determine one or more surfaces of the vehicle 101 (e.g., side surfaces, roof). In some embodiments, the system 100 may be configured to discard data from the sensors that falls outside a predetermined range, which may reduce the number of false data points.

According to some embodiments at least one referential sensor can be can be positioned within the tunnel 102 proximate its entrance 104, and data detected by the reference sensor can be used by the system to determine a reference point for a vehicle entering the tunnel 102. In some embodiments, the data detected by the referential sensor can be used by the system to determine multiple references points for a given vehicle. For example, in some embodiments, each vehicle entering the tunnel 102 may be assigned a reference point corresponding to one or more of the front bumper, the windshield, a position that is a predetermined length of the cab from another reference point (e.g., four feet from the windshield), the rear bumper, a luggage rack, a mirror, and a trailer hitch. By using multiple reference points and by knowing the relative positions of each reference point, it is possible to later determine a current position of the vehicle, even if a given reference point is hidden from a given sensor (e.g., covered by detergent, hidden by a brush). As will be discussed more fully below, the location or use of certain reference points may be determined by the type of vehicle, as automatically determined by the system.

Some existing conveyors 110 of automated car wash systems include a roller 112, which is configured to traverses a vehicle 101 along the path of the conveyor by engaging and pushing against a wheel of the vehicle 101. Often, the roller 112 is configured to push against the rear side of a front wheel. During the car wash process, the vehicle 101 may begin to travel faster than the conveyor 110, such that the front wheel disengages the roller 112. This is commonly referred to as the vehicle "lurching" forward. In such a scenario, it is possible for a vehicle to lurch forward until the front side of a rear wheel contacts the roller 112 or until the vehicle collides into a forward object. That is, a lurch can result in a vehicle being at a different position along the path of the conveyor 110 than would be expected based on the position of the roller 112. Lurches can cause reference points to be inaccurate.

To combat this issue, some embodiments may include multiple referential sensors (e.g., sensors S1, S2), and the system may be configured determine which sensor provided the most accurate data for each reference point, adopt the most accurate data as the reference point, and discard the less accurate data. For example, some embodiments may include a first referential sensor S1 and a second referential sensor S2. In some embodiments, the second referential sensor S2 can be positioned at a predetermined distance farther along the path of the conveyor 110 (i.e., farther from the entrance 104) than the first referential sensor S1. As the vehicle 101 passes the first referential sensor S1, the first referential sensor S1 can detect the vehicle, creating first detection data, and the system can determine, based on the first detection data, one or more first temporary reference points. Similarly, as the vehicle 101 passes the second referential sensor S2, the second referential sensor S2 can detect the vehicle, creating second detection data, and the system can determine, based on the second detection data, one or more second temporary reference points.

For each reference point (e.g., the front bumper, the windshield, a location that is a predetermined length of the cab from another reference point, the rear bumper), the system may determine the distance between the location of the corresponding first and second temporary reference points to the contemporaneous location of a corresponding position on the conveyor 110 (e.g., the roller 112). For example, the system may determine that the distance between the first temporary front bumper reference point and the roller 112 (at the time the first front bumper reference point was detected) is distance X, and the system may determine that the distance between the second temporary front bumper reference point and the roller 112 (at the time the second front bumper reference point was detected) is distance Y. In some embodiments, if distance X is smaller than distance Y, the system may determine that first temporary front bumper reference point is the front bumper reference point and may discard the second temporary front bumper reference point. Conversely, if distance Y is smaller than distance X, the system may determine that second temporary front bumper reference point is the front bumper reference point and may discard the first temporary front bumper reference point. While the temporary reference point adopted as the "true" reference point using this method may have also been detected while the vehicle was surging, this method may ensure that the adopted "true" reference point is more correct (e.g., the wheel is closer to the roller 112) than the discarded reference point.

Although the above embodiment was described as including two referential sensors, it is to be understood that use of any number of referential sensors is herein contemplated. For example, systems included three, four, or more referential sensors may provide more accurate data regarding the location of reference points, but such systems also require additional sensors, which can result in larger upfront, maintenance, and replacement costs. As described above, in some embodiments, it may be sufficient to use a single referential sensor. To maximize accuracy of a single referential sensor system, it may be helpful to position the referential sensor near the correlator, which may enable the referential sensor to detect the vehicle before the vehicle is given an opportunity to lurch.

In some embodiments, the system 100 can monitor or otherwise receive data indicative of a speed of the conveyor 110. In some embodiments, the system can monitor the time elapsed after a vehicle passes a predetermined location (e.g., the entrance 104, a predetermined sensor). In some embodiments, the system may include an encoder 126 configured to measure travel of the conveyor 110 such that the position of a given point on the conveyor 110 can be monitored, without necessitating timekeeping. Based on the speed of the conveyer 110 and the position of the reference point with respect to the conveyor 110 and an elapsed amount of time (or distance traveled as indicated by the encoder 126), the system can determine an expected position of the vehicle 101 at a given time. The system can receive data detected by other sensors, such as a third sensor S3, and can compare the position of vehicle 101 to the expected position of the vehicle 101. For example, at a given time, the system may expect the vehicle 101 to be located at position being monitored by the third sensor S3, and data received from the third sensor S3 may be indicative of whether the vehicle 101 is indeed at the expected position at the expected time. In some embodiments, the expected position may be referred to as a checkpoint. In some embodiments, data received from the third sensor S3 (or another sensor) may be indicative of the vehicle passing within a predetermined distance of the checkpoint (e.g., within a predetermined distance of the corresponding sensor). In some embodiments, the system may be configured to determine if the vehicle 101 (or, more specifically, any of the established reference points on the vehicle 101) is at an expected position within a predetermined range of time. In some embodiments, the predetermined range of time may include an estimated arrival time and a predetermined deviation from the estimated arrival time. In some embodiments, the system may be configured to determine a subsequent estimated arrival time for a subsequent checkpoint in response to determining that the vehicle 101 passed an earlier checkpoint during the corresponding predetermined range of time. In some embodiments, the system may be configured to determine a predetermined range of time corresponding to the estimated arrival of the vehicle 101 at each checkpoint, and the system may be configured to determine all ranges of time prior to the vehicle 101 passing the first checkpoint.

In some embodiments, the expected position may correspond to a position along the length of the conveyor 110. That is, a vehicle 101 that is not located at an expected position is likely located at a position that is either forward or behind the expected position, but still along the conveyor path. In some embodiments, the expected position may correspond to a lateral position with respect to the conveyor path such that a vehicle 101 not being at an expected position has deviated from the conveyor path. In some embodiments, the system may determine whether the vehicle is within an expected range of positions. In some embodiments, the expected range of positions may include the expected position and predetermined range of deviation from the expected position.

According to some embodiments, if data received from a particular sensor does not indicate that the vehicle 101 is at an expected position at an expected time (or within an expected time range), they system may sound an alarm or may stop or halt the conveyor 110. In some embodiments, responsive to determining that the vehicle 101 is not at an expected position at an expected time or within an expected time range, the system can be configured to stop only the conveyance of vehicles and/or the operation of dispensers and washers that are located at or behind the last known position of the vehicle 101 in question. This may permit vehicles that are within the tunnel and ahead of the vehicle 101 in question to continue to receive an uninterrupted car wash. In certain embodiments, the conveyor 110 may be configured to selectively disengage a vehicle 101. For example, the conveyor 110 may be configured to retract one or more rollers 112 into a conveyor channel of the conveyor 110, which may permit certain rollers 112 that are extended out of the conveyor channel to engage a vehicle's wheel while retracted rollers 112 can pass by a vehicle 101 or other object without contacting it. Thus, it may be possible in some embodiments, to stop all vehicles 101 behind a given point in the tunnel 102 while permitting all vehicles 101 ahead of the given point in the tunnel 102 to continue their washes.

In some embodiments, the system may be configured to transmit a warning alert if a sensor located near a particular object known to interfere with vehicle detection, such as a brush or other washer, does not detect the vehicle 101 at the expected position. In some embodiments, the system may be configured to trigger an alarm or stop the conveyor system if more than a threshold number of consecutive sensors detect does not detect the vehicle at the expected position, even if each of the consecutive sensors is located near an object known to interfere with vehicle detection.

In some embodiments, the system can simultaneously receive data from multiple sensors such that the system can simultaneously track the position of multiple reference points on multiple vehicles. In some embodiments, each sensor may be configured to detect each type of reference point for each vehicle. For example, if the system is configured to detect only the front bumper, windshield, and rear bumper, a given sensor may be configured to detect the front bumper, windshield, and rear bumper for each vehicle. Some sensors, however, may be positioned near an object that frequently prevents the sensor from detecting a certain type of reference point, which may cause false positives or erroneously triggered alarms. And in some embodiments, it may be more difficult to detect a certain type of reference point for a certain type of vehicle. For example, detergent may be prone to building up on the windshield of a sedan, which may prevent a sensor located near the detergent dispenser 114 from detecting the windshield of a sedan. To reduce the number of false positives, a sensor located near a detergent dispenser 114 may be configured to not detect the windshield of sedans, or the system may be configured to ignore data from such a sensor regarding the windshield of sedans. As another example, brushes 118 having long pieces of material (e.g., a "wrap") may be prone to catching on a trailer hitch of a vehicle 101 and when caught on a trailer hitch, may prevent a sensor from detecting the rear bumper. And because trailer hitches are mostly commonly present on pickup trucks or large SUVs, a sensor located near a "wrap" or other brush 118 may be configured to not detect the rear bumper of pickup trucks and/or large SUVs, or the system may be configured system to ignore data from such a sensor regarding the rear bumper of pickup trucks and/or large SUVs. As another example, some vehicles may be vertically short to the point that a brush 118 may block the front bumper from a sensor. Thus, in some embodiments, a sensor located near a brush 118 may be configured to not detect the front bumper of vehicles below a predetermined height, or the system may be configured system to ignore data from such a sensor regarding the front bumper of vehicles below a predetermined height.

In some embodiments, the system may be configured to automatically detect the vehicle type of each vehicle 101. In some embodiments, one or more sensors may detect various measurements of the vehicle 101, and based on these measurements, the system can be configured to characterize the vehicle 101 as one of a predetermined list of vehicle types. In some embodiments, the measurements detected by the sensor(s) may include the height, width, total length of the vehicle, length of the cab, distance between the end of cab and the rear bumper, distance between the windshield and the front bumper, and height of the floor of the vehicle, and any other useful measurement. In some embodiments, the vehicle types may include small sedan, large sedan, small SUV, large SUV, small pickup truck without bed cover, small pickup truck with bed cover, large pickup truck without bed cover, and large pickup truck with bed cover. Some embodiments may include more or fewer vehicle types. Certain embodiments may be configured to identify vehicles by make and model, and the system may be configured to ignore certain reference point data from certain sensors according to the make and model of a given vehicle 101.

To better position sensors to detect references points of passing vehicles 101, certain sensors may be positioned within the tunnel 102 at various heights and lateral positions, depending on the objects near the sensors. For example, a specific sensor may be positioned directly overhead (e.g., at a height of eight feet) and along a centerline of the tunnel 102, which may be advantageous if, for example, brushes 118 are configured to engage the sides of the vehicle 101 near that particular sensor. As another example, a specific sensor may be positioned at a lower height and/or to the side of the centerline of the tunnel 102, which may be advantageous if, for example, detergent is being sprayed from overhead atop the vehicle 101 near that particular sensor. In certain embodiments, some or all of the sensors may include a configurable sensitivity. In some embodiments, the system may be configured to selectively adjust the sensitivity of a given sensor. In some embodiments, they system may be configured to dynamically adjust the sensitivity of a given sensor. For example, the system may be configured to determine that a certain type of reference point for a certain vehicle type has been resulting in an alarm being, and after a predetermined number of alarms, the system may be configured to increase the sensitivity of the given sensor. If a predetermined number of the appropriate vehicle type successfully pass without an alarm being triggered, the system may be configured to adopt the increased sensitivity for all vehicles 101 of the corresponding vehicle type. If the alarms continue, the system may revert to the previous sensitivity setting for that sensor.

In some embodiments, the system can be configured to monitor a gap or separation distance between adjacent vehicles in the tunnel 102. In some embodiments, responsive to determining that the gap between adjacent vehicles is below a predetermined range, the system may transmit an alert or can stop the conveyer 110.

In some embodiments, responsive to determining that a vehicle 101 is deviating or has deviated from the path of the conveyor 110, the system can determine, based on data received from one or more sensors, an estimated speed of the vehicle 101 and an estimated future path of the vehicle 101. Based on the estimated future path and estimated speed, the system can determine whether the vehicle is likely to collide with forward vehicle located farther forward in the tunnel. In some embodiments, the system may be configured to compare the estimated speed of the vehicle to the relative speed of the forward vehicle. In some embodiments, in response to determining that the speed of the vehicle 101 is greater than the speed of the forward vehicle, the system may trigger an alarm or stop the conveyor or may instruct the conveyor to increase the speed at which the adjacent vehicle is being traversed though the tunnel 102 (e.g., by disengaging the following vehicle 101 from the conveyor 110 and increasing the speed of the conveyor 110 such that the speed of the forward vehicle is increased).

In some embodiments, based on the estimated future path and estimated speed, the system can determine whether the vehicle 101 is likely to collide with a moveable washer of the automated car wash system 100. If the vehicle 101 is likely to collide with a moveable washer, they system 100 can instruct the moveable washer to move from its current location to a located outside of the estimated future path of the vehicle 101. This may prevent damage to the automated car wash system 100.

In some embodiments, if a sensor (e.g., sensor S3) detects the vehicle 101 at an expected position and within an expected time range, the conveyor may continue to run in normal operation. Subsequently, a next sensor (e.g., sensor S4) may detect whether the vehicle is at a next expected position and within a next expected time range. If sensor S4 does indeed detect the vehicle at the expected location and time, the conveyor may continue to run in normal operation. If, at any point, a given sensor does not detect the vehicle 101 at an expected time and within an expected time range, any of the precautionary measures (e.g., stopping the conveyor) discussed herein may be initiated by the system.

In some embodiments, the system may be configured to determine dimensional information of the vehicle 101 based on data received from one or more sensors. For example, the system may be configured to determine the length, width, and height of the vehicle 101. In some embodiments, the system may be configured to determine the size and/or relative location of certain features of the vehicle 101, such as the size and relative location of the tires. Based on the dimensions of the vehicle 101 and the known location of the vehicle 101 (e.g., as determined by one or more sensors), the system can instruct various dispensers as to how much of a substance (e.g., detergent, water) should be applied to the vehicle and where the substance should be applied. Because existing automated car wash systems typically apply the amount of a substance needed to cover the largest vehicle that can be accommodated by the tunnel 102, the disclosed vehicle-specific embodiment may result in less of the substance being wasted on smaller vehicles. This may also result in the vehicle being more completely covered with the appropriate substance. For example, the system may instruct a detergent dispenser 114 to apply soap or detergent to the vehicle 101, a water dispenser 116 to spray water on the vehicle 101, a tire dressing applicator 122 to spray tire dressing only where the tires are located, and a finishing chemical applicator 124 to spray a finishing chemical (e.g., polish, wax) on the vehicle. Similarly, the system may instruct a washer 118 (e.g., a brush) to engage only when the vehicle 101 is positioned adjacent to the washer 118. This may prevent the washer 118 from otherwise being engaged while the vehicle is not present, which unnecessarily wastes energy. In some embodiments, the system 100 may include a chemical reclaim system 130, which may include catch plates, funnels, or drains 132 for each chemical (e.g., detergent, tire dressing, polish, wax) and a corresponding recovery tank 134 for each chemical that is in fluid communication with the corresponding catch plate, funnel, or drain 132, such as by one or more pipes 136. Thus, some embodiments may be configured to recapture excess chemicals or other substances applied to a vehicle but not used during the car wash process.

Figure 2:
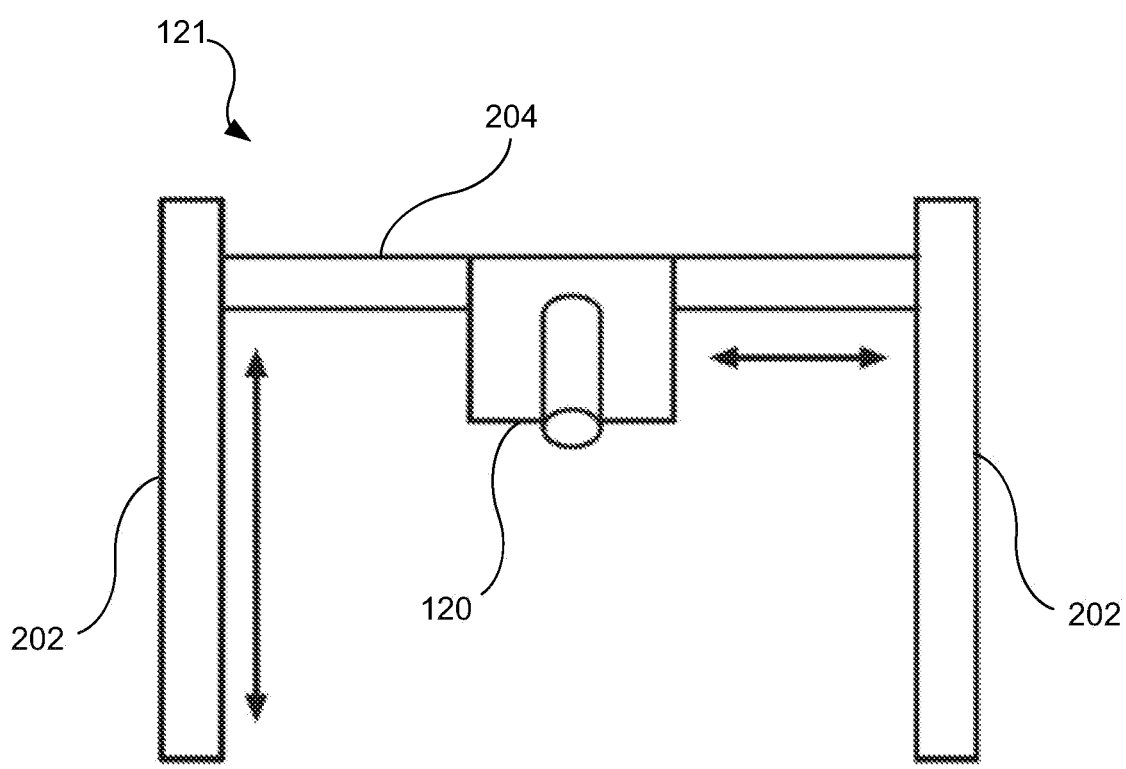
FIG. 2 is a schematic of an example extendable boom, according to certain embodiments of the present disclosure.

As discussed above, data received from one or more sensors can be used to determine surfaces of the vehicle. In some embodiments, this data can be used to determine a contour (e.g., a contour from along the front bumper to the hood to the front windshield to the roof to the rear windshield to the trunk to the rear bumper) of the vehicle 101, which may be useful during, for example, drying. In some embodiments, the system may include one or more dryers 120 positioned on a boom 121, as shown in FIGS. 1A and 1B and as more clearly shown in FIG. 2. The boom 121 may have one or more vertical supports 202 along which a horizontal support 204 can traverse. The dryer 120 can then travel along the horizontal support. The system can instruct the dryer 120 and horizontal support 204 to move in accordance with the detected contour of the vehicle 101, which may enable the dryers 120 to more efficiently and effectively dry the vehicle 101. In some embodiments, the boom 121 may be configured to follow the contour of the vehicle 101 at a predetermined distance away from the vehicle (i.e., the dry moving horizontally along the horizontal support 204 and the horizontal support 204 moving vertically along the one or more vertical supports 202).

Figure 3:
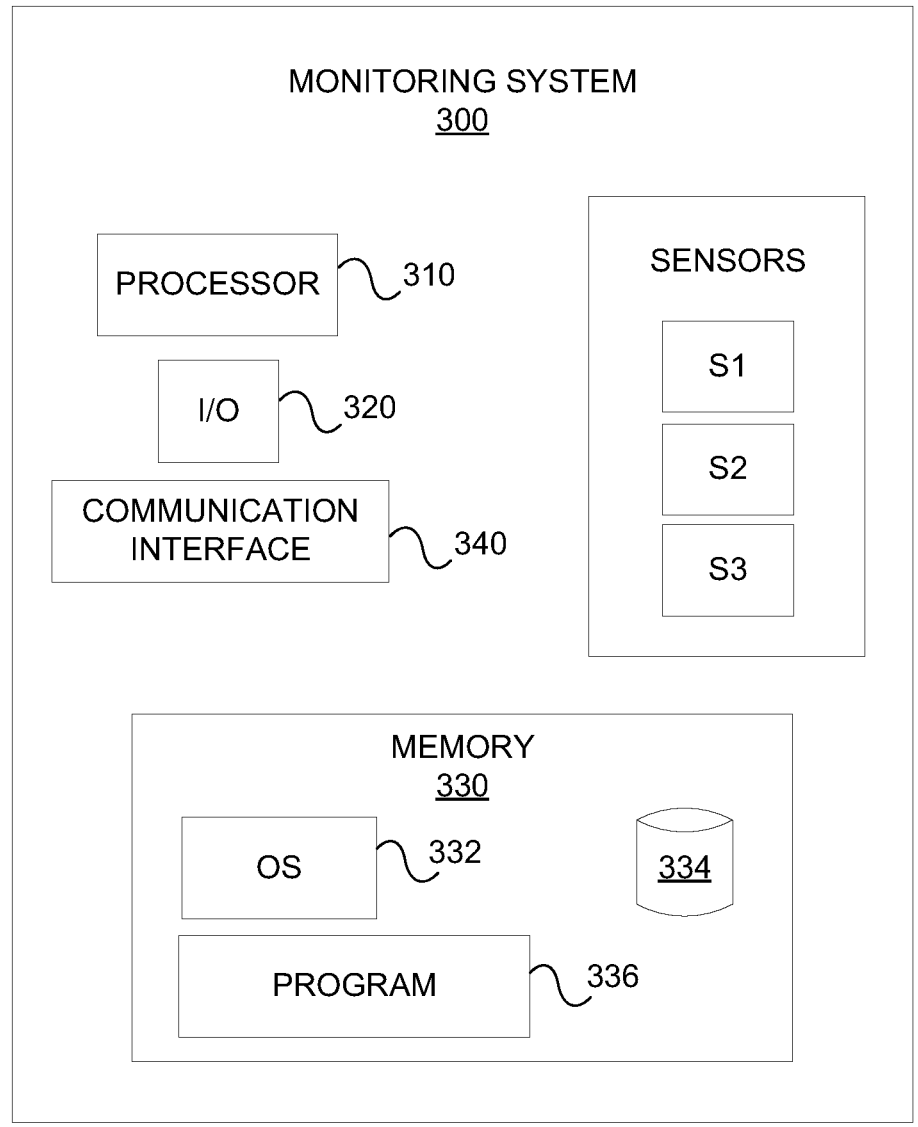
FIG. 3 is a component diagram of an example monitoring system, according to certain embodiments of the present disclosure.

Referring to FIG. 3, some embodiments of the disclosed technology may include a monitoring system 300 configured to monitor an automated car wash system 100 and sensors (e.g., S1, S2, S3, . . . ) associated with the automated car wash system 100. As shown, monitoring system 300 may include a processor 310, an input/output (I/O) device 320, a memory 330—which may contain an operating system (OS) 332, a storage device 334, which may be any suitable repository of data, and a program 336—and a communication interface 340. In certain embodiments, monitoring system 300 may include a user interface (U/I) device for receiving user input data, such as data representative of a click, a scroll, a tap, a press, or typing on an input device that can detect tactile inputs.

In some embodiments, monitoring system 300 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

Processor 310 may include one or more of an application specific integrated circuit (ASIC), programmable logic device, microprocessor, microcontroller, digital signal processor, co-processor or the like or combinations thereof capable of executing stored instructions and operating upon stored data. Memory 330 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 332, application programs 336 (including, for example, a web browser application, a widget or gadget engine, and or other applications, as necessary), executable instructions and data. In some embodiments, processor 310 may include a secure microcontroller, which may be configured to transmit and/or facilitate secure lines of communication. In some embodiments, some or all of the processing techniques described herein can be implemented as a combination of executable instructions and data within memory 330.

Processor 310 may be one or more known processing devices, such as a microprocessor from the Pentium™ family manufactured by Intel™, the Turion™ family manufactured by AMD™, or the Cortex™ family or SecurCore™ manufactured by ARM™. Processor 310 may constitute a single-core or multiple-core processor that executes parallel processes simultaneously. For example, processor 310 may be a single core processor that is configured with virtual processing technologies. In certain embodiments, processor 310 may use logical processors to simultaneously execute and control multiple processes. Processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Monitoring system 300 may include one or more storage devices 334 configured to store information used by processor 310 (or other components) to perform certain functions related to the disclosed embodiments. As an example, monitoring system 300 may include memory 330 that includes instructions to enable processor 310 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

Memory 330 may include one or more memory devices that store data and instructions used to perform one or more features of the disclosed embodiments. Memory 330 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 330 may include software components that, when executed by processor 310, perform one or more processes consistent with the disclosed embodiments.

While monitoring system 300 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the monitoring system 300 may include a greater or lesser number of components than those illustrated. Some embodiments may exclude certain components discussed herein.

Figure 4:
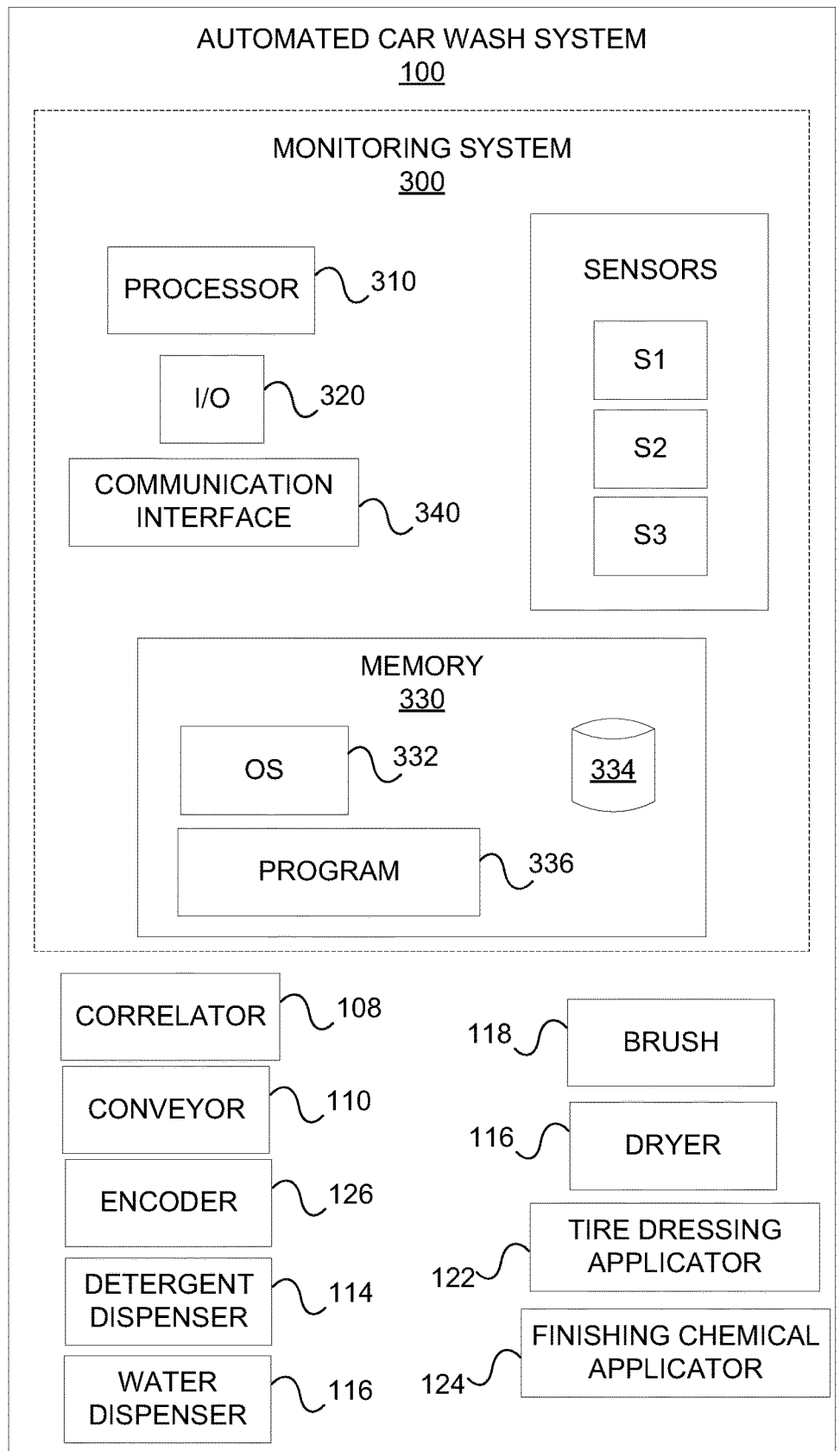
FIG. 4 is a component diagram of an example automated car wash system, according to certain embodiments of the present disclosure.

According to some embodiments, monitoring system 300 is incorporated or integrated into another device. For example, referring to FIG. 4, monitoring system 300 may be included in the automated car wash system 100 itself. The automated car wash system 100 may include all of the functionalities traditionally provided by the monitoring system 300, and the automated car wash system 100 may include some or all of the components and/or functionalities of the monitoring system 300 as disclosed herein.

Figure 5:
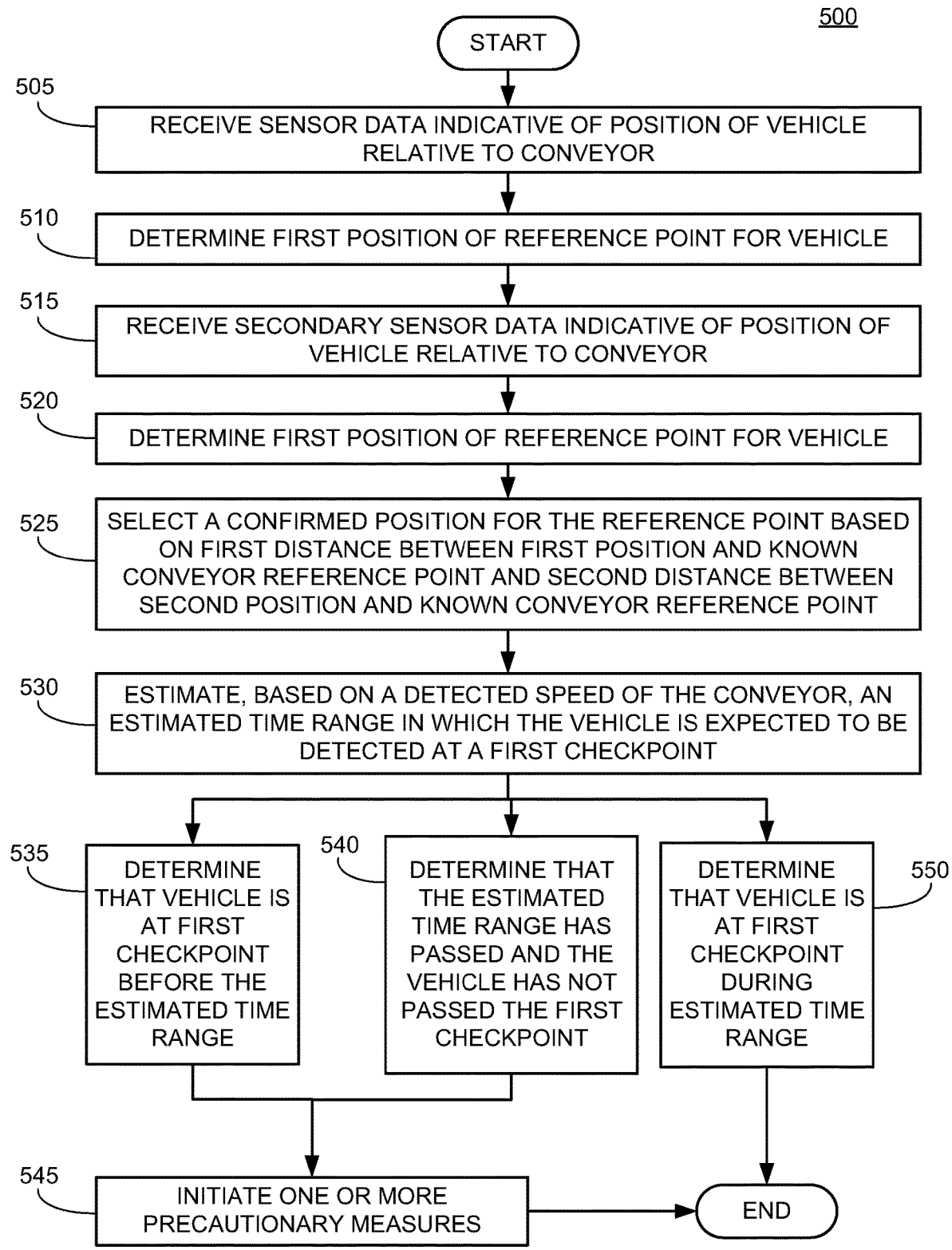
FIG. 5 is a flowchart showing operation of an example monitoring system, according to certain embodiments of the present disclosure.

Referring to FIG. 5, a flowchart of an example method 500 for preventing a collision is provided. Method 500 may be performed by some or all of components, subcomponents, and/or functionalities of monitoring system 300.

In block 505, the monitoring system 300 may receive, from a first sensor S1, data indicative of a position of a vehicle 101 relative to a conveyor 110. In some embodiments, the data can include several data points corresponding to various portions of the vehicle 101 (e.g., front bumper, front windshield, roof, trunk lid, rear bumper). In block 510, the monitoring system 300 may determine a first position for one or more reference points based on the received data from the first sensor S1. In block 515, the monitoring system 300 may receive, from a second sensor S2, secondary data indicative of a second position of the vehicle 101 relative to the conveyor. In block 520, the monitoring system 300 may determine a second position for each of the one or more reference points based on the received data from the second sensor S2. In block 525, the monitoring system 300 may, for each reference point, select, based on the proximity of the first position to a known conveyor position and the proximity of the second position to the known conveyor position, a confirmed position for the reference point relative the known conveyor position. This may permit the monitoring system 300 to determine whether the relative positioning of the confirmed reference point position and the conveyor reference point changes, which may be indicative of the vehicle's wheel becoming disengaged from the roller 112 or of the vehicle 101 otherwise deviating from the conveyor path. In block 530, the monitoring system 300 may estimate, based on a detected speed of the conveyor, an estimated time range in which the vehicle 101 is expected to be detected by a third sensor S3 at a first checkpoint.

At least three scenarios may result: the monitoring system 300 may receive data from the third sensor S3 indicating that the vehicle 110 is at the first checkpoint before the estimated time range (block 535), the monitoring system 300 may determine that the estimated time range has passed and no data indicating that the vehicle 110 is at the first checkpoint has been received from the third sensor S3 (block 540), or the monitoring system 300 may receive data from the third sensor S3 indicating that the vehicle 110 is at the first checkpoint during the estimated time range (block 550). In block 540, responsive to determining that the vehicle 101 was not at the first checkpoint during the estimated time range (i.e., the vehicle 110 is at the first checkpoint before the estimated time range as in block 535, the estimated time range has passed and no data has been received that indicates the vehicle 110 is at the first checkpoint as in block 540), the monitoring system 300 may determine that the vehicle 101 has likely deviated from the conveyor path or has likely become disengaged with the conveyor 110 (e.g., roller 112). In block 545, the monitoring system 300 may initiate one or more precautionary measures, which may include triggering an alarm or stopping some or all of the conveyor system.

Subsequent to determining that the vehicle 110 is at the first checkpoint during the estimated time range as in block 555, the monitoring system 300 may continue normal operation of the automated car wash 100 such that the steps at and following block 530 with respect to subsequent sensors (e.g., sensors S4, S5, . . . ) and corresponding subsequent checkpoint s (e.g., second, third, fourth, . . . ). In addition to detecting whether the vehicle, as whole, has arrived at a checkpoint during the corresponding estimated time range, each checkpoint sensor located at a checkpoint can be configured to detect whether each reference point (e.g., front bumper, windshield, mirror, luggage rack, rear window, rear bumper) of each vehicle arrives at a given checkpoint at the corresponding estimated time range. In some embodiments, the estimated time range refers to a single time range in which all pertinent reference points are expected to be detected by a given sensor. In some embodiments, each reference point has a corresponding estimated time range during which a given sensor is expected to detect that reference point. By monitoring multiple reference points on a vehicle with each sensor, the number of sensors required to monitor a tunnel is reduced, and the accuracy of the system's tracking of each vehicle's progression through the tunnel is increased.

Figure 6:
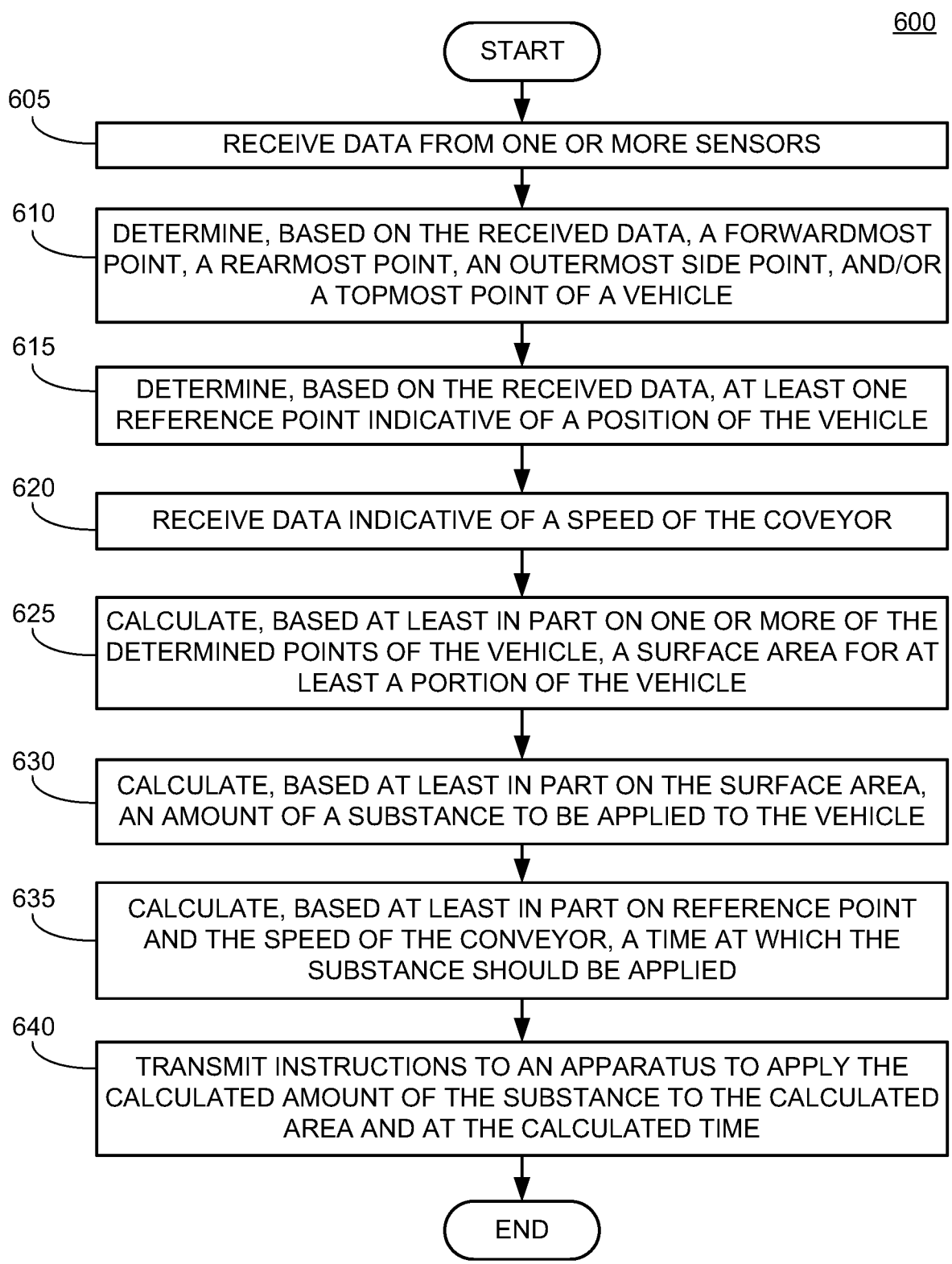
FIG. 6 is a flowchart showing operation of an example monitoring system, according to certain embodiments of the present disclosure.

Referring to FIG. 6, a flowchart of an example method 600 for identifying an area of a vehicle to be washed is provided. Method 600 may be performed by some or all of components, subcomponents, and/or functionalities of monitoring system 300.

In block 605, the monitoring system 300 may receive data from one or more sensors. In block 610, the monitoring system 300 may determine, based on the received data, at least one of a forwardmost point, a rearmost point, one or more outermost side points, and a topmost point of a vehicle 101. More specifically, in some embodiments, the monitoring system 300 may determine, based on the received data, dimensions of the vehicle, a topography of the vehicle, and the relative locations of specific parts of features of the vehicle (e.g., the location of each tire with respect to the rest of the vehicle). In block 615, the monitoring system 300 may determine, based on the received data, at least one reference point indicative of a position of the vehicle 101 relative to the conveyor 110 such that the monitoring system can determine a location for each of the edge(s) of the vehicle 101 with respect to the conveyor 110. In block 620, the monitoring system may receive data indicative of a speed of the conveyor.

In block 625, the monitoring system 300 may calculate, based at least in part on one or more of the determined points Calculate, based at least in part on one or more of the determined points of the vehicle, a surface area for at least a portion of the vehicle of the vehicle 101, a surface area for at least a portion of the vehicle 110. In block 630, the monitoring system 300 may calculate, based at least in part on the surface area, an amount of a substance to be applied to the vehicle 110. In block 635, the monitoring system 300 may calculate, based at least in part on the reference point and the speed of the conveyor, a time at which the substance should be applied to the vehicle 110. In block 640, the monitoring system 300 may transmit instructions to an apparatus (e.g., a detergent dispenser 114, water dispenser 116, tire dressing applicator 122, finishing chemical applicator 124) to apply the calculated amount of the substance at the calculated time and to the calculated area.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

What is claimed is:

1. A method comprising:
   receiving, from a referential sensor, referential data indicative of a position of a vehicle relative to a conveyor, the data including at least one data point corresponding to one or more portions of the vehicle;
   determining, based on the received referential data, a location of a vehicle reference point with respect to a location of a conveyor reference point;
   receiving a first detected speed of the conveyor;
   determining, based on the first detected speed of the conveyor, a first estimated time range in which the vehicle is expected to pass a first checkpoint;
   receiving, from a checkpoint sensor, checkpoint data indicative of the vehicle passing within a predetermined distance of the first checkpoint; and
   determining whether the vehicle passed within the predetermined distance of the first checkpoint during the first estimated time range.

2. The method of claim 1, wherein the referential sensor is a first referential sensor, the referential data is first referential data, the location of the vehicle reference point is a first temporary location of the vehicle reference point, and the location of the conveyor reference point is a first location of the conveyor reference point, the method further comprising:
   receiving, from a second referential sensor, second referential data indicative of a subsequent position of the vehicle relative to the conveyor, the second referential data including at least one data point corresponding to one or more portions of the vehicle;
   determining, based on the received second referential data, a second temporary location of the vehicle reference point with respect to a second location of the conveyor reference point;
   for each portion of the one or more portions of the vehicle and based at least in part on the first referential data, determining a first distance between the first temporary location of the vehicle reference point and the first location of the conveyor reference point;
   for each portion of the one or more portions of the vehicle and based at least in part on the second referential data, determining a second distance between the second temporary location of the vehicle reference point and the second location of the conveyor reference point;
   responsive to determining that the first distance is less than the second distance, selecting the first temporary location of the vehicle reference point as the location of the vehicle reference point; and responsive to determining that the first distance is greater than the second distance, selecting the second temporary location of the vehicle reference point as the location of the vehicle reference point.

3. The method of claim 1 further comprising:
receiving a second detected speed of the conveyor;
responsive to determining that the vehicle passed within the predetermined distance of the first checkpoint during the first estimated time range, determining, based on the second detected speed of the conveyor, a second estimated time range in which the vehicle is expected to pass a second checkpoint;
receiving, from a second checkpoint sensor, second checkpoint data indicative of the vehicle passing within a predetermined distance of the second checkpoint;
responsive to determining that the vehicle passed within the predetermined distance of the second checkpoint before the second estimated time range, determining that the vehicle has likely become disengaged from the conveyor; and
responsive to determining that the vehicle has likely become disengaged from the conveyor, initiating precautionary safety measures.

4. The method of claim 3 further comprising:
determining that the second estimated time range has elapsed without having received, from a second checkpoint sensor, second checkpoint data indicative of the vehicle passing within a predetermined distance of the second checkpoint;
responsive to determining that the second estimated time range has elapsed without having received data indicative of the vehicle passing within a predetermined distance of the second checkpoint, determining that the vehicle has likely become disengaged from the conveyor; and
responsive to determining that the vehicle has likely become disengaged from the conveyor, initiating precautionary safety measures.

5. The method of claim 1 further comprising:
determining a first distance between the vehicle reference point and the conveyor reference point; and
responsive to detecting a second distance between the vehicle reference point and the conveyor reference point, initiating precautionary safety measures.

6. The method of claim 5, wherein the second distance is transverse to the direction of the conveyor, the method further comprising:
responsive to detecting a second distance between the vehicle reference point and the conveyor, determining that the vehicle has deviated from a path of the conveyor.

7. The method of claim 6, wherein the checkpoint sensor is a first checkpoint sensor, the method further comprising:
responsive to determining that the vehicle has deviated from the path of the conveyor, determining, based on data received from a second checkpoint sensor, an estimated future path of the vehicle and an estimated speed of the vehicle; and
determining, based on the estimated speed and estimated future path of the vehicle, that the vehicle will likely collide with a movable washer;
wherein initiating precautionary safety measures comprises transmitting, to the movable washer, instructions for the movable washer to move to a location outside of the estimated future path of the vehicle.

8. The method of claim 3 further comprising:
responsive to determining that the vehicle did not pass within a predetermined distance of a second checkpoint during the second estimated time range, initiating the precautionary safety measures comprising at least one of triggering an alarm and stopping the conveyor.

9. The method of claim 8, wherein stopping the conveyor comprises stopping conveyance of vehicles for only portions of the conveyor at or behind a forwardmost edge of the vehicle.

10. The method of claim 1, wherein the first estimated time range comprises an estimated arrival time and a predetermined time deviation from the estimated arrival time.

11. An automated car wash system comprising:
a tunnel having an entrance and an exit;
a conveyor configured to automatically traverse a vehicle from the entrance to the exit;
a plurality of sensors configured to collect data indicative of dimensions of the vehicle;
one or more processors; and
memory storing instructions that, when executed by the one or more processors, cause the system to:
determine dimensions of the vehicle;
determine a location of a vehicle reference point and a location of a conveyor reference point;
based on the dimensions of the vehicle, determine an amount of detergent to apply to the vehicle;
based on the dimensions of the vehicle and the respective locations of the vehicle reference point and the conveyor reference point, determine a target cleaning area of the vehicle and a time at which to apply detergent to the target cleaning area of the vehicle; and
transmit, to a detergent dispenser, instructions regarding the time at which to apply the amount of detergent to the target cleaning area of the vehicle.

12. The automated car wash system of claim 11, wherein the instructions, when executed by the one or more processors, further cause the system to:
based on the dimensions of the vehicle, determine an amount of rinse water to apply to the vehicle;
based on the dimensions of the vehicle and the respective locations of the vehicle reference point and the conveyor reference point, determine a target rinse area of the vehicle and a time at which to apply rinse water to the target rinse area of the vehicle; and
transmit, to a water dispenser, instructions regarding the time at which to apply the amount of rinse water to the target rinse area of the vehicle.

13. The automated car wash system of claim 11, wherein the instructions, when executed by the one or more processors, further cause the system to:
determine a size and a location of each tire of the vehicle;
based on the size of each tire of the vehicle, determine an amount of tire dressing to apply to each respective tire;
determine a tire reference point with respect to at least one of the tires; and
based at least in part on the size of each tire and the tire reference point, determine a target dressing area for each respective tire and a time at which to apply tire dressing to each corresponding target dressing area.

14. The automated car wash system of claim 11, wherein the instructions, when executed by the one or more processors, further cause the system to:
based on the dimensions of the vehicle, determine an amount of finishing chemical to apply to the vehicle;

based on the dimensions of the vehicle and the respective locations of the vehicle reference point and the conveyor reference point, determine a target finishing area of the vehicle and a time at which to apply a finishing chemical to the target finishing area of the vehicle; and transmit, to a finishing chemical dispenser, instructions regarding the time at which to apply the amount of finishing chemical to the target finishing area of the vehicle.

15. The automated car wash system of claim 14, wherein the finishing chemical is at least one of polish and wax.

16. A non-transitory, computer-readable medium storing instructions that, when executed by one or more processors, cause a computer system to:

determine, based on first data from at least one sensor of a plurality of sensors, a rearmost point of a first vehicle in a tunnel of an automated car wash system;

determine, based on second data from the at least one sensor of the plurality of sensors, a forwardmost point of a second vehicle in the tunnel of the automated car wash system;

determine an initial distance between the rearmost point of the first vehicle and the forwardmost point of the second vehicle;

monitor, as the first and second vehicles are traversed through the tunnel via a conveyor system of the automated car wash system, updated first data and updated second data received from the at least one sensor of the plurality of sensors;

determine, based on the updated first data and updated second data, an updated distance between the rearmost point of the first vehicle and the forwardmost point of the second vehicle; and responsive to determining that the updated distance is less than the initial distance, initiate precautionary safety measures.

17. The non-transitory, computer-readable medium of claim 16, wherein initiating precautionary safety measures is in response to the updated distance being less than a predetermined gap between the first and second vehicles.

18. The non-transitory, computer-readable medium of claim 16, wherein the precautionary safety measures include at least one of triggering an alarm and stopping the conveyor.

19. The non-transitory, computer-readable medium of claim 18, wherein stopping the conveyor comprises stopping conveyance of vehicles for only portions of the conveyor at or behind a current location of the forwardmost point of the second vehicle.

20. The non-transitory, computer-readable medium of claim 16 storing instructions that, when executed by one or more processors, further cause a computer system to:

determine, based on the first data from the least one sensor of a plurality of sensors, a contour of the first vehicle;

determine that the vehicle is within a predetermined distance of a dryer boom, the dryer boom comprising a vertical support, a horizontal support slidably disposed on the vertical support and configured to selectively traverse the vertical support, and a dryer slidably disposed on the horizontal support and configured to selectively traverse the horizontal support;

determine, based on the contour of the first vehicle, a contoured drying path; and instruct the dryer boom to move in accordance with the contoured drying path such that the dryer boom generally follows the contour of the first vehicle as the first vehicle passes the dryer boom, the dryer boom maintaining a predetermined distance of separation from the first vehicle.

* * * * *